United States Patent [19]

Haeffner

[11] Patent Number: 5,692,619
[45] Date of Patent: Dec. 2, 1997

[54] APPARATUS FOR FILTERING SUSPENSIONS

[75] Inventor: Roger Haeffner, Stockholm, Sweden

[73] Assignee: Beloit Technologies, Inc., Wilmington, Del.

[21] Appl. No.: 448,517

[22] PCT Filed: Dec. 14, 1992

[86] PCT No.: PCT/SE92/00862

§ 371 Date: Jun. 5, 1995

§ 102(e) Date: Jun. 5, 1995

[87] PCT Pub. No.: WO94/13880

PCT Pub. Date: Jun. 23, 1994

[51] Int. Cl.⁶ .................................................. B01D 33/21
[52] U.S. Cl. ..................................... 209/271; 210/331
[58] Field of Search ................................. 209/268, 269, 209/271; 210/331, 347, 402

[56] References Cited

U.S. PATENT DOCUMENTS 3,591,009  7/1971  Luthi et al. .................. 210/331 X
4,136,028  1/1979  Toivonen ..................... 210/331 X
5,124,029  6/1992  Fjallstrom et al. .......... 209/271 X

FOREIGN PATENT DOCUMENTS 1012064  8/1991  WIPO ........................... 210/331
9112063  8/1991  WIPO .
9112065  8/1991  WIPO .

*Primary Examiner*—Tuan Nguyen
*Attorney, Agent, or Firm*—Dirk J. Veneman; Raymond W. Campbell; Paul F. Donovan

[57] ABSTRACT

An apparatus for filtering suspensions is provided with rotatable annular vertical disks (4) covered with filter material and partly submerged in the suspension to be filtered. Each disc is provided with a number of cells (22) for receiving filtrate from the suspension as the disc is rotated. The cells of each disc communicate with a central filtrate chamber (7) via respective accumulation chambers (30) formed by wall means (31) in the filtrate chamber. Each accumulation chamber of each disc extends axially past the disc and has an outlet (32) which also extends axially past the disc. The advantage is that a more concentrated coarse fraction of the suspension can be achieved.

8 Claims, 5 Drawing Sheets

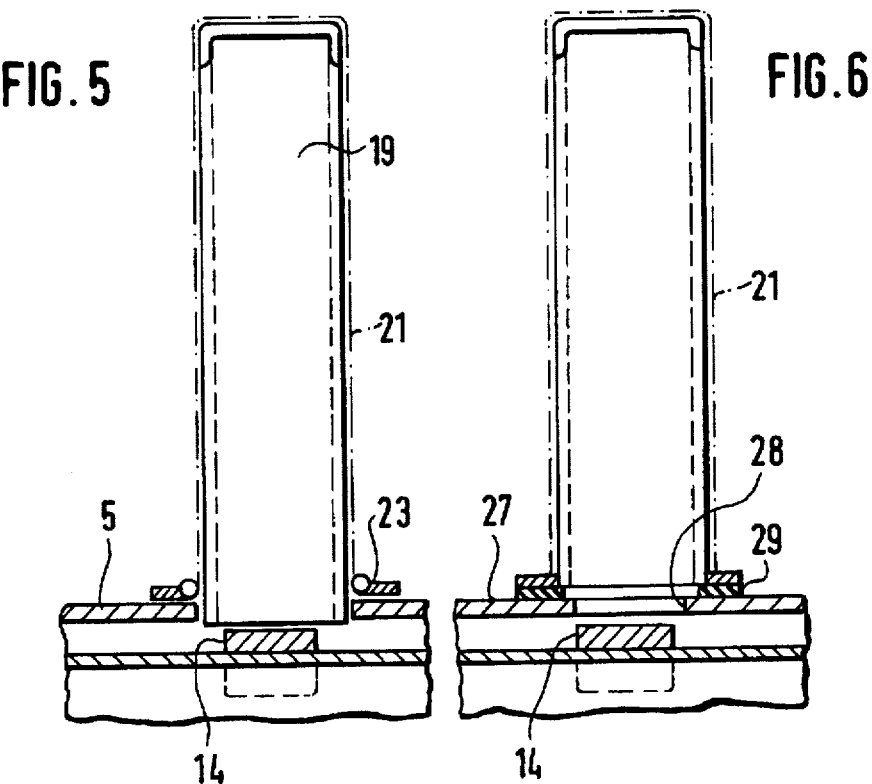
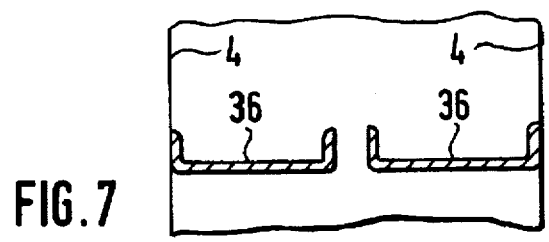
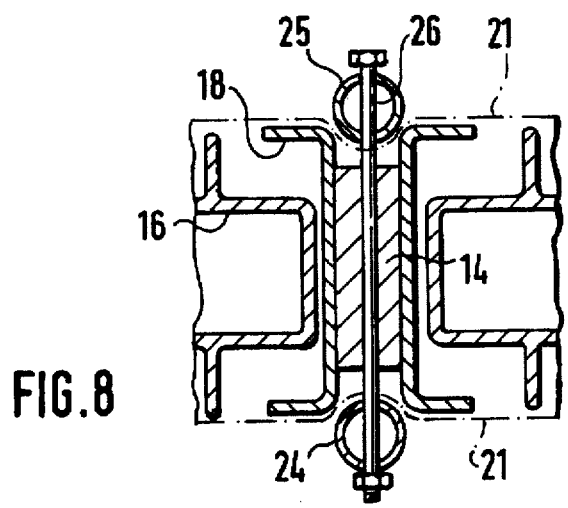

APPARATUS FOR FILTERING SUSPENSIONS

BACKGROUND OF THE INVENTION

1. Field of the Invention

The present invention relates to an apparatus for filtering suspensions, such as fibre pulp suspensions.

2. Description of the Prior Art

WO 91/12063 discloses an apparatus for filtering suspensions, such as fibre pulp suspensions, including a container for the suspension to be filtered, inlet means for supplying the suspension to the container, at least one annular, substantially vertical disc arranged in the container, wall means connected to the disc and forming a filtrate chamber at the center of the disc, and means for rotating the disc about a horizontal axis extending centrally through the disc. There are means dividing the disc into a number of segments disposed in series around the disc. Two side walls of filter material cover the disc at mutual sides thereof, each segment and said side walls of filter material defining a cell for receiving filtrate. Each cell communicates with the filtrate chamber. Means are provided for controlling the volume of the suspension in the container during operation, such that said side walls of filter material are partly above the suspension in the container, while the filtrate chamber is at least partly submerged in the suspension in the container, whereby a fine fraction of the suspension is forced through the filter material into the cells and further into the filtrate chamber, and a coarse fraction of the suspension is created outside the filter disc. There are means for maintaining a pool of fine fraction in the filtrate chamber. Fine fraction discharge means is provided for discharging said fine fraction of the suspension from the filtrate chamber, and coarse fraction discharge means is provided for discharging said coarse fraction of the suspension from the apparatus.

In this prior art filtering apparatus each cell functions as a dropleg at the ascending part of the rotating disc, when at least a part of the cell is above the pool of fine fraction in the filtrate chamber, so that a negative pressure is created in the cell. Thus, the pressure difference between the outside and the inside of the cell is increased by said created negative pressure in the cell. The increased pressure difference gives the advantages that the flow of fine fraction through the filter material covering the cell is increased, and a compressed mat of particles (mainly coarse particles) can be formed on said filter material resulting in an increased particle concentration of the coarse fraction of the suspension.

Furthermore, the prior art apparatus can be operated such that each cell contains a volume of fine fraction, when at least a part of the cell has been displaced up above the suspension in the container, while the outlet of the cell still opens into the pool of fine fraction. The advantage of this is that fine fraction is also sucked from the mat of particles which covers the filter material of the cell above the suspension, whereby the particle concentration of the coarse fraction is further increased.

However, the capability of the prior art apparatus for producing a concentrated coarse fraction primarily depends on the height of the column of fine fraction in each cell, i.e. the height of the suction leg, as seen at the ascending part of the disc. Thus, the higher column of fine fraction there is trapped in the cells, the more concentrated coarse fraction can be obtained. The prior art apparatus is deficient in this respect, because during rotation of the disc the fine fraction trapped in each ascending cell has to escape through the outlet of the cell before the cell descends back into the suspension, so that the created mat of particles on the side walls of the cell is not rewetted with fine fraction. In consequence, the outlet of the cell has to be large enough to allow a sufficient flow of fine fraction from the cell. This limits the radial extension of the cell, and as a result the column of fine fraction in the cell is limited. The radial extension of the cells cannot be increased by simply increasing the diameter of the disc, because for practical reasons (such as enabling shipment of the apparatus on trucks) the diameter of the disc should not exceed about 3.5 meters.

SUMMARY OF THE INVENTION

A feature of the present invention is to provide an improved filtering apparatus of the type discussed above, which does not suffer from the above-mentioned deficiencies of the prior art apparatus.

This feature is fulfilled by a filtering apparatus of the prior art type defined above, which is characterized in that the cells communicate with the filtrate chamber via respective accumulation chambers formed by further wall means extending in the filtrate chamber, each accumulation chamber extending axially past the disc and having an outlet into the filtrate chamber also extending axially past the disc.

The provision of accumulation chambers with outlets extending axially past the disc enables said outlets to be dimensioned for the required flow of fine fraction from the cells, even if said outlets are positioned relatively close to the center of the disc. The advantage of this is that the height of the column of fine fraction trapped in the cells can be considerably increased, as compared to the prior art apparatus.

Said further wall means can be arranged such that each cell is at least partly above said pool of fine fraction at some point of revolution of the disc at the ascending part of the disc, while the outlet of the accumulation chamber associated to the cell opens into said pool of fine fraction. The advantage of this is that the negative pressure in a cell being at said point of revolution cannot be reduced by air entering the associated accumulation chamber from the filtrate chamber. Said further wall means can also be arranged such that each cell is at least partly above the suspension in the container at some point of revolution, while the outlet of the accumulation chamber opens into said pool of fine fraction, so that the negative pressure in the cell is maintained at least for a while when filtrate is sucked from the mat on the cell above the suspension.

The outlet of each accumulation chamber is preferably displaced backwardly in the direction of rotation of the disc in relationship to the cell associated to the accumulation chamber. As a result, the height of the column of fine fraction in the cell and the corresponding negative pressure prevailing in the cell can be increased.

In practice, the apparatus of the invention usually include a plurality of discs. In this case, the cells of the discs preferably form rows of cells extending in parallel with said horizontal axis, and the cells of each said row of cells communicate with an accumulation chamber extending axially past the discs and having an outlet also extending past the discs.

These, and other objects, features and advantages of the invention will become readily apparent to those skilled in the art upon reading the description of the preferred embodiment, in conjunction with the attached drawings.

BRIEF DESCRIPTION OF THE DRAWINGS

FIG. 5 is a part of a sectional view along line V—V of FIG. 3, FIG. 6 is a modification of the embodiment shown in FIG. 5, FIG. 7 is an enlarged part of a sectional view along line VII—VII of FIG. 1, FIG. 8 is a sectional view along line VIII—VIII of FIG. 3.

DESCRIPTION OF THE PREFERRED EMBODIMENT

Figure 1:
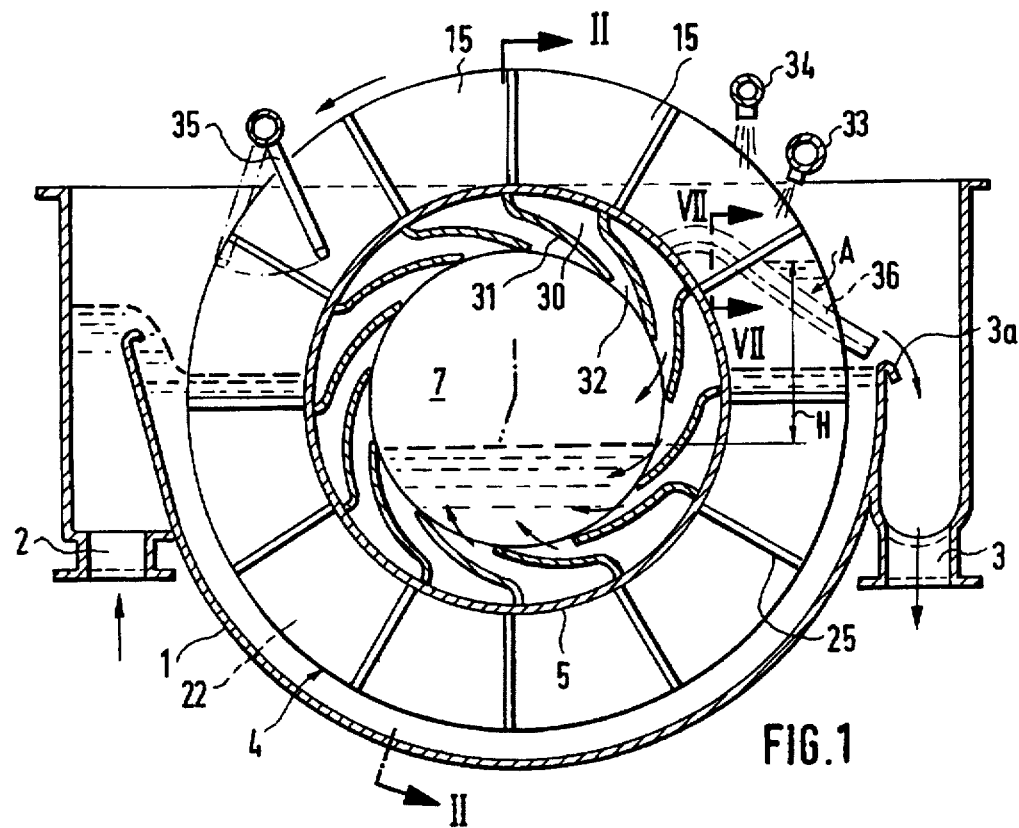
FIG. 1 is a vertical cross-section of an embodiment of the filtering apparatus of the invention.
Figure 2:
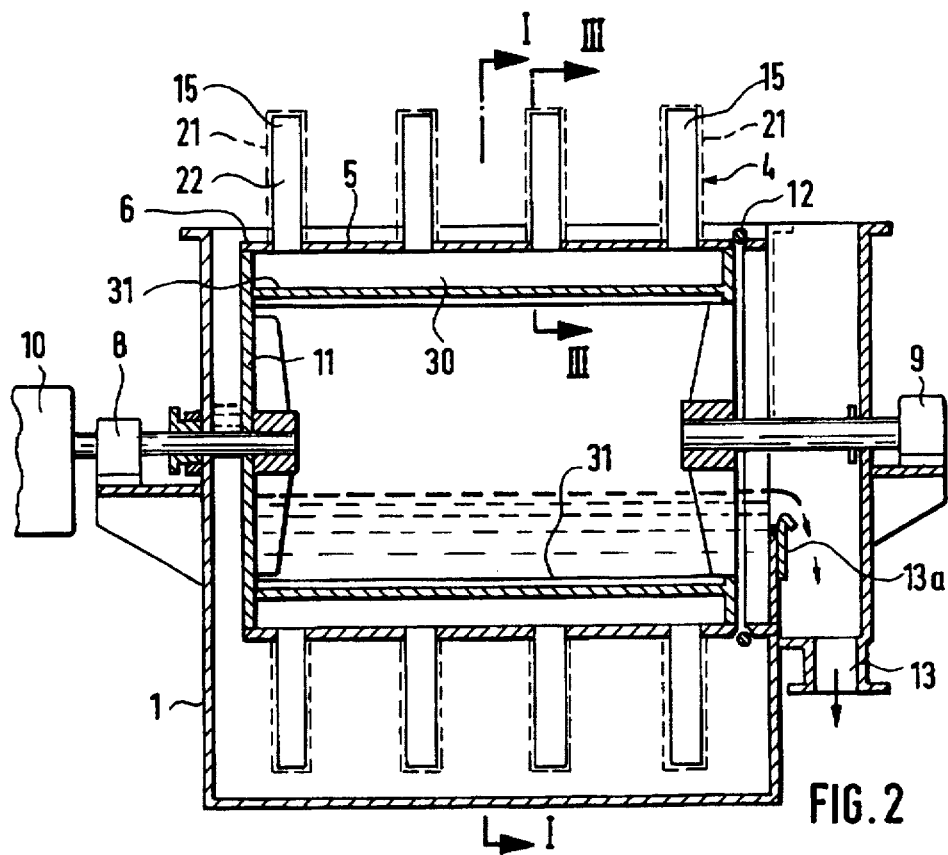
FIG. 2 is a longitudinal cross-section taken along line II—II of FIG. 1.

The filtering apparatus shown in FIGS. 1 and 2 comprises a container 1 with an inlet 2 for the suspension to be filtered at one side of the container 1, and an outlet 3 for thickened suspension, i.e. created coarse fraction, at the opposite side of the container 1. A member 3a for controlling the volume of the suspension in the container 1 is arranged at the outlet 3. In the container 1 there are four annular discs 4 spaced from one another and arranged transversely to a horizontal axis, which extends centrally through the discs 4. The radially inner ends of the annular discs 4 are sealingly attached to circular cylindrical wall portions 5, which form a hollow shaft 6, the interior of which constitutes a filtrate chamber 7.

The shaft 6 is journalled on the container 1 by means of two bearings 8 and 9. A drive motor 10 is connected to a gable wall 11 at one end of the shaft 6 for rotating the shaft 6 and the discs 4 about said horizontal axis. Opposite the gable wall 11, the hollow shaft 6 has an open end, at which one of the cylindrical wall portions 5 seals against the container 1 via a sealing ring 12. The filtrate chamber 7 communicates via said open end of the shaft 6 with a fine fraction outlet 13. The container 1 has an adjustable overflow member 13a for providing a pool of fine fraction in the filtrate chamber 7.

Each disc 4 is divided by twelve partition wall members 14 into twelve segments 15 disposed in series around the disc 4. Each segment 15 comprises a double-walled support member 16 having radially extending ridges 17, and a frame consisting of two U-profiled side beams 18, 19 and a U-profiled radially outer end beam 20, which are applied on the side edges of the support member 16. The side beams 18, 19 are welded to the partition wall members 14.

Each disc 4 is at both sides covered with side walls 21 of flexible filter material, such as cloth, the side walls 21 being supported by the ridges 17. A cell 22 for receiving filtrate is defined by each segment 15 and the side walls 21 of filter material covering the segment 15. The discs 4 are positioned such that the cells 22 of the discs 4 form rows of cells 22 extending in parallel with said horizontal axis.

In FIG. 5, the reference numeral 23 indicates a device for radially stretching the side walls 21 of filter material against the wall portions 5. In FIG. 8 there is shown a device for circumferentially stretching the side walls 21 of filter material along the disc 4, comprising radially extending pairs of pipes 24, 25, which are located between the segments 15 at the outside of the side walls 21, and draw bars 26 connecting the pipes 24, 25 of each pair, for drawing the pipes 24, 25 towards one another, so that the side walls 21 of filter material are stretched.

As an alternative, the cylindrical wall portions 5 can be replaced by a single cylindrical drum 27 provided with holes 28 for the respective cells 22 (FIG. 6). In this case, each filter segment 15 may be clamped to the drum 27 as a separate unit by means of clamping bars (not shown), the segment 15 being radially sealed to the drum 27 via a sealing ring 29.

The cells 22 of each said row of cells communicate with the filtrate chamber 7 via an accumulation chamber 30 formed by wall members 31 in the filtrate chamber 7. Each accumulation chamber 30 extends axially along the entire filtrate chamber 7 and has an outlet 32 into the filtrate chamber 7 also extending axially along the entire filtrate chamber 7. In the circumferential direction of the discs 4 the wall members 31 extend from the segments 15 backwardly in the direction of rotation of the discs 4. In consequence, the outlet 32 of each accumulation chamber 30 is circumferentially displaced backwardly in the direction of rotation in relationship to the cells 22 of the row of cells associated to the accumulation chamber 30.

At the ascending part of each disc 4 above the suspension there are two consecutive spray nozzles 33, 34 at each side of the disc 4, for providing the removal of created mats of particles from the disc 4. At the descending part of the disc 4 above the suspension there is an oscillating spray nozzle 35 at each side of the disc 4, for cleansing the side walls 21 of filter material.

Between adjacent discs 4 there are entrainment members 36 attached to the discs 4 for rotation therewith. Each entrainment member 36 is U-profiled and has a limited extension axially from the disc 4, in order to avoid interference with the oscillating spray nozzle 35, as the entrainment member 36 passes the latter during rotation of the disc 4 (FIG. 7).

An important field of use of the apparatus of the invention is for dewatering fibre pulp suspensions and, therefore, the operation of the apparatus shown in FIGS. 1 to 8 will be described in the following in connection with dewatering of a fibre pulp suspension.

A fibre pulp suspension to be dewatered having a fibre concentration of typically 0.6% is supplied to the container 1 through the inlet 2, so that the side walls 21 of filter material which cover some of the segments 15 at the top of the discs 4, are above the suspension. The shaft 6 is rotated by the drive motor 10 in a direction, such that the segments 15 which are located next to the inlet 2 for the suspension to be filtered are displaced downwards, while the segments 15 which are located next to the coarse fraction outlet 3 are displaced upwards. The hydrostatic pressure in the suspension in the container 1 causes a fine fraction of the suspension, mainly containing water, to pass through the side walls 21 of filter material into the cells 22. The fine fraction so created flows from the cells 22 via the accumulation chambers 30 into the filtrate chamber 7. A pool of fine fraction is maintained in the chamber 7 by means of the overflow member 13a, across which fine fraction passes and then is discharged via the fine fraction outlet 13.

As the segments 15 are displaced through the suspension in the container 1, a porous mat of fibres is created on the side walls 21 of filter material covering the segments 15. The mat on each segment 15 becomes thicker and more liquid impervious during the displacement of the segment 15 through the suspension. When a cell 22 is at the position noted by the reference letter A in FIG. 1, this cell 22 has raised its content of fine fraction up above the pool of fine fraction in the filtrate chamber 7, so that a negative pressure corresponding to the head H of the operating fine fraction in the cell 22 (indicated in FIG. 1) is created in the cell 22. The filtrate outlet hole 32 of the accumulation chamber 30 associated to this cell 22 opens into the pool of fine fraction, thereby preventing air from entering the cell 22 from the filtrate chamber 7. Said created negative pressure increases the flow of fine fraction into the cell 22 and gives rise to a tighter (or in other words: less water containing) mat of fibres on the filter material covering the cell 22.

As the cell 22 at the position A has moved substantially up above the suspension in the container 1, the most part of the fine fraction which is sucked out of the mat of fibres into the cell 22 is replaced by air. This increases the particle concentration of the mat of fibres.

The spray nozzles 33 spray fine jets of water against the discs 4, so that narrow strips of the mat are removed from the filter material close to the radially outer ends of the discs 4. This facilitates air to enter the cells 22, so that the negative pressure ceases in the latter and filtrate remaining in the cells 22 can quickly escape from the cells 22 into the accumulation chambers 30.

The mats of fibres covering the ascending segments 15 above the suspension are loosened by water jets from the spray nozzles 34 and dropped into the suspension in the container 1 close to the coarse fraction outlet 3. The loosened mats of fibres floating on the suspension are entrained by means of the entrainment members 36 to the coarse fraction outlet 3. The mats of fibres leaving the apparatus through the outlet 3 constitutes the created coarse fraction of the suspension, which in this case may have a fibre concentration of up to about 5%, possibly more.

As an alternative, the mats of fibres may be dropped into discharge chutes arranged between the discs without the mats being rewetted by the suspension. In such a case it would be possible to achieve a coarse fraction having a fibre concentration of about 10%.

Figure 3:
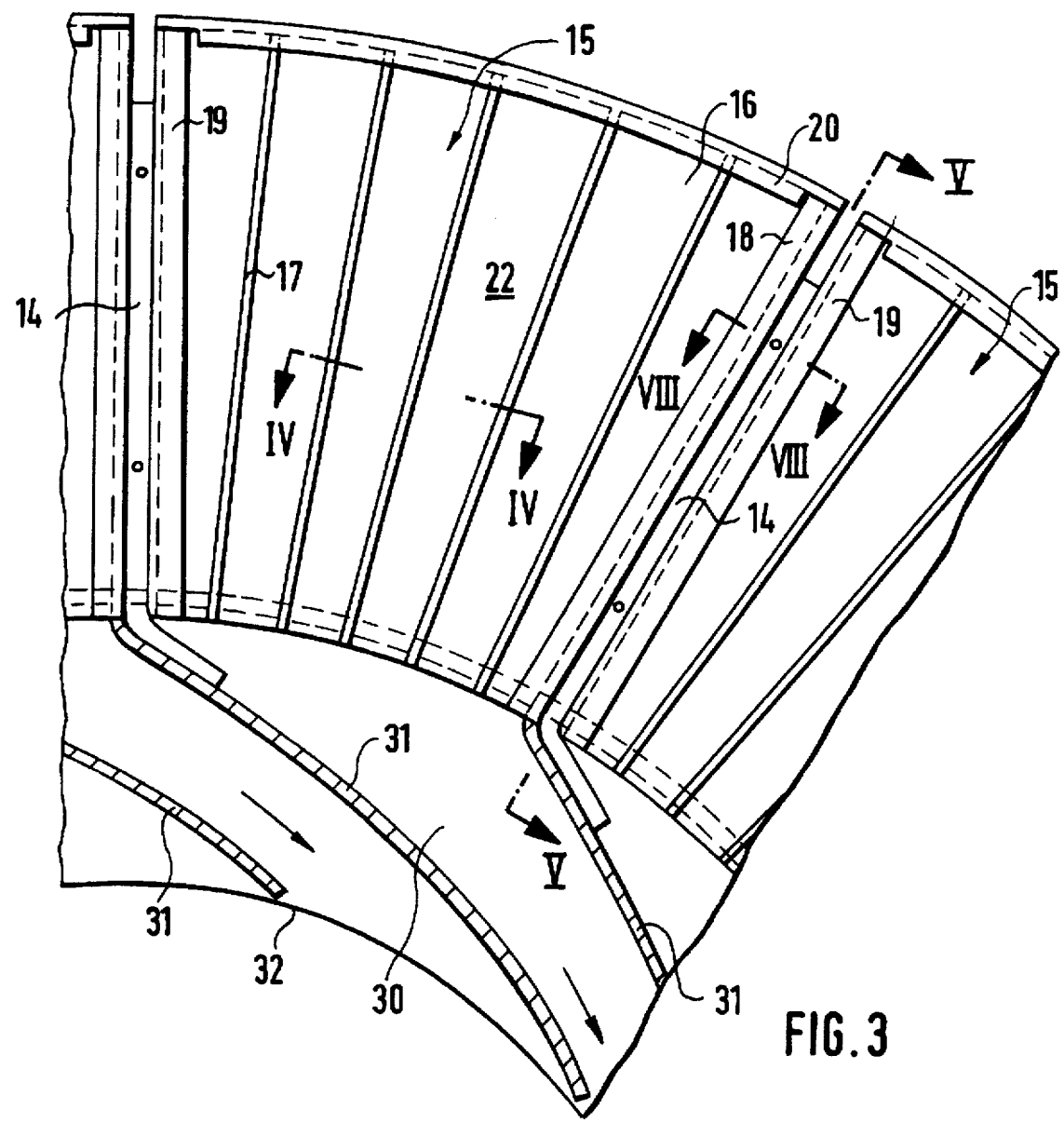
FIG. 3 is a part of a sectional view along line III—III of FIG. 2.
Figure 4:
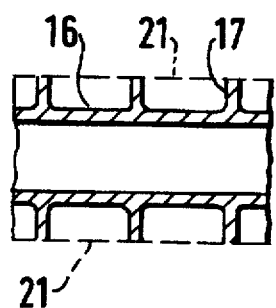
FIG. 4 is a section along line IV—IV of FIG. 3.
Figure 9:
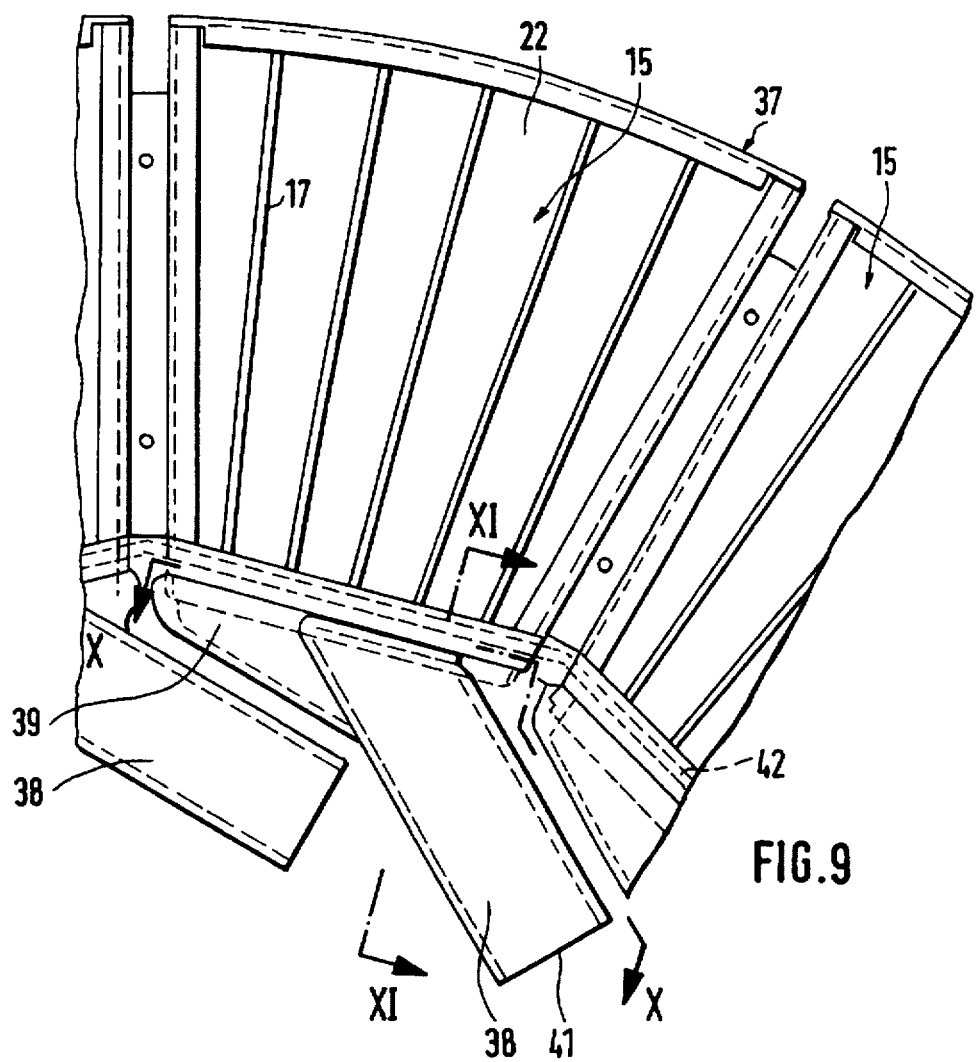
FIG. 9 is a modification of the embodiment shown in FIG. 3.
Figures 10, 11:
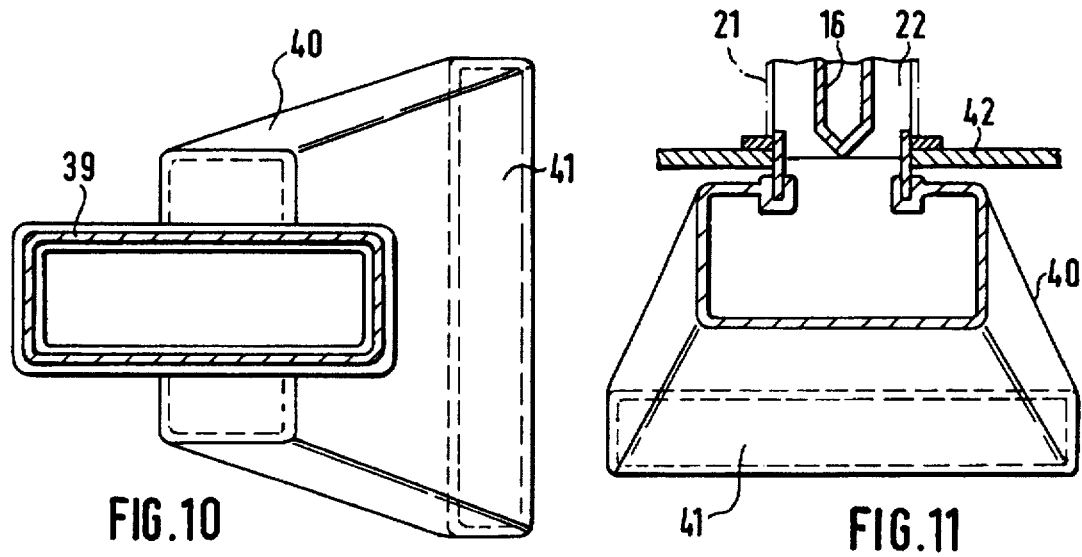
FIG. 10 is a view along line X—X of FIG. 9.
FIG. 11 is a partial view along line XI—XI of FIG. 9.

The disc 37 shown in FIG. 9 is substantially of identical construction to the disc 4 shown in FIG. 3, except that its accumulation chambers 38 are designed differently and do not communicate with the cells 22 of any other disc 37. Each accumulation chamber 38 is formed by a rectangular connection wall member 39, and an outlet wall member 40 extending from the connection wall member 39 backwards in the direction of rotation to an outlet 41 (FIGS. 10 and 11). The connection wall member 39 is inserted through a rectangular hole in a polygonal drum 42 and is connected to the segment 15, such that the corresponding cell 22 communicates with the interior of the wall member 39. The outlet wall member 40 has a rectangular cross section and extends axially past the cell 22 at both sides of the disc 37.

Figure 12:
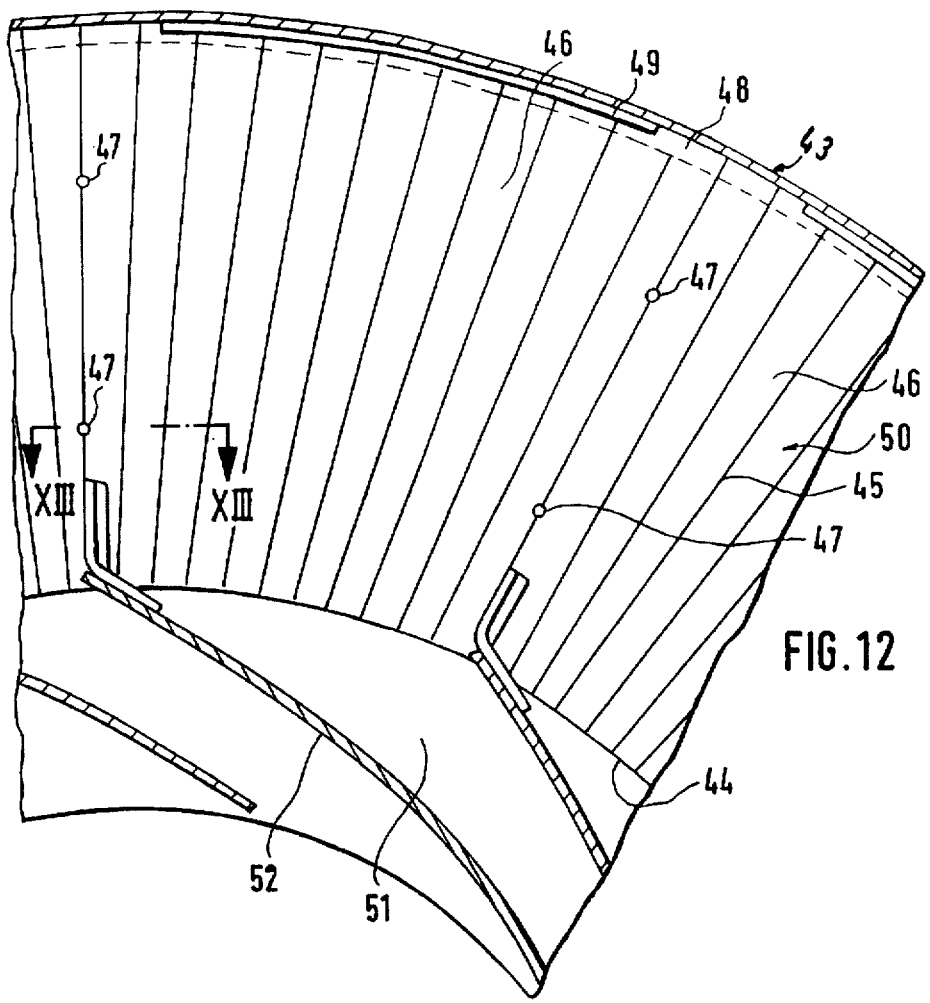
FIG. 12 is another modification of the embodiment shown in FIG. 3.

The modified disc 43 shown in FIG. 12 comprises a corrugated plate 44 extending around the entire disc 43, for supporting the side walls 21 of filter material. The ridges 45 formed by the corrugated plate 44 extend substantially radially. (As an alternative, however, the ridges 45 may extend non-radially towards the filtrate chamber.)

Figure 13:
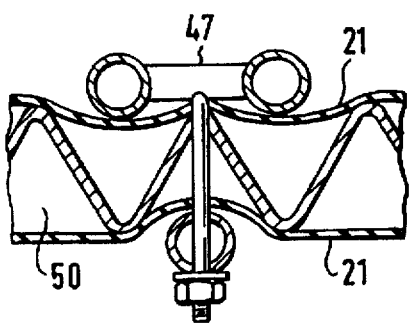
FIG. 13 is a sectional view along line XIII—XIII of FIG. 12.

The cells 46 of the modified disc 43 are axially defined by the plate 44 and the side walls 21 of filter material, and are circumferentially defined by stretching devices 47 arranged to press the flexible side walls 21 against some of the ridges 45 (FIG. 13), so that filtrate in the cells 46 cannot pass said ridges 45 in the circumferential direction of the disc 43. (The positions of the devices 47 at the plate 44 are indicated by circular marks in FIG. 12.) The radially outer end of the corrugated plate 44 is inserted into a U-profiled beam 48, for stiffening the disc 43.

Radially within the beam 48, parts of the corrugated plate 44 are cut away to form channels 49 extending circumferentially along the disc 43 within the respective cells 46. The circumferential extension of each channel 49 is limited, such that the channel 49 does not cross the ridges 45 against which the side walls 21 of filter material are pressed by the stretching devices 47. The channels 49 allow air to communicate between the radial channels 50 formed between the ridges 45, so as to facilitate the discharge of filtrate from cells 46 ascending above the suspension.

The cells 46 of a plurality of the modified discs 43 may be connected to accumulation chambers 51 formed by wall members 52 in like manner to the accumulation chambers 30 described in connection with the apparatus shown in FIGS. 1–8.

Figure 14:
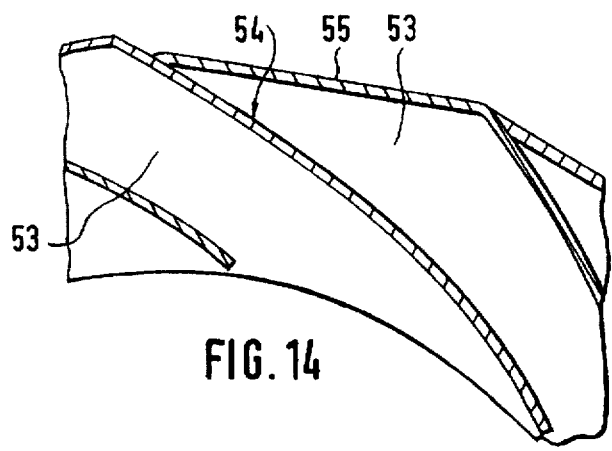
FIG. 14 is a detail of the embodiment shown in FIG. 12.

The modified accumulation chambers 53 shown in FIG. 14 are formed by wall members 54 including plane wall parts 55, which are welded to one another to form a polygonal drum. Segments of the types according to FIGS. 3, 9 and 12 may be attached directly onto the wall parts 55 to form discs on said drum. The fabrication of the modified accumulation chambers 53 is advantageous, because the welding operation for assembling the wall parts 55 into the final drum can be carried out from outside the drum.

While an apparatus for filtering suspensions, such as fibre pulp suspensions has been shown and described in detail, herein, various changes may be made without departing from the scope of the present invention.

I claim:

1. An apparatus for filtering fibre pulp suspensions, comprising:

a container for the suspension to filtered;

inlet means for supplying the suspension to the container;

at least one annular, substantially vertical disc arranged in the container;

wall means connected to the disc and forming a filtrate chamber at the center of the disc;

means for rotating the disc about a horizontal axis extending centrally through the disc;

means for dividing the disc into a number of segments disposed in series around the disc;

two side walls of filter material covering the disc at mutual sides thereof, each segment and the side walls of filter material defining a cell for receiving filtrate, said cell communicating with the filtrate chamber;

means for controlling the volume of the suspension in the container during operation, such that said side walls of filter material are partly above the suspension in the container, while the filtrate chamber is at least partly submerged in the suspension in the container, whereby a fine fraction of the suspension is forced through the filter material into the cells and further into the filtrate chamber, and a coarse fraction of the suspension is created outside the disc;

means for maintaining a pool of fine fraction in the filtrate chamber;

fine fraction discharge means for discharging said fine fraction of the suspension from the filtrate chamber;

coarse fraction discharge means for discharging said coarse fraction of the suspension from the apparatus; and at least one accumulation chamber formed by further wall means extending in the filtrate chamber, each accumulation chamber extending axially past the disc and having an outlet into the filtrate chamber also extending axially past the disc such that the cells communicate with the filtrate chamber.

2. An apparatus according to claim 1, wherein said further wall means are arranged such that each cell is at least partly above said pool of fine fraction at some point of revolution of the disc at the ascending part of the disc, while the outlet of the accumulation chamber associated to the cell opens into said pool of fine fraction.

3. An apparatus according to claim 2, wherein said further wall means are arranged, such that each cell is at least partly above the suspension in the container at some point of the revolution of the disc at the ascending part of the disc, while the outlet of the accumulation chamber associated to the cell opens into said pool of fine fraction.

4. An apparatus according to any one of claims 1 to 3, wherein the outlet of each accumulation chamber is circumferentially displaced backwardly in the direction of rotation of the disc in relationship to the cell associated to the accumulation chamber.

5. An apparatus for filtering fibre pulp suspensions, comprising;

a container for the suspension to be filtered;

inlet means for supplying the suspension to the container;

a plurality of annular, substantially vertical discs arranged in the container;

wall means connected to the discs and forming a filtrate chamber extending centrally through the disc;

means for rotating the discs as a single unit about a horizontal axis extending centrally through the discs;

means for dividing each disc into segments disposed in series around the disc;

side walls of filter material covering the discs at mutual sides thereof, each segment and the side walls of filter material defining a cell for receiving filtrate, the discs being positioned such that the cells form rows of cells extending in parallel with said horizontal axis, each cell communicating with the filtrate chamber;

means for controlling the volume of the suspension in the container during operation, such that said side walls of filter material are partly above the suspension in the container, while the filtrate chamber is at least partly submerged in the suspension in the container, whereby a fine fraction of the suspension is forced through the filter material into the cells and further into the filtrate chamber, and a coarse fraction of the suspension is created outside the discs;

means for maintaining a pool of fine fraction in the filtrate chamber;

fine fraction discharge means for discharging said fine fraction of the suspension from the filtrate chamber;

coarse fraction discharge means for discharging said coarse fraction of the suspension from the apparatus; and an accumulation chamber formed by further wall means in the filtrate chamber, the accumulation chamber extending axially past the discs and having an outlet into the filtrate chamber also extending axially past the discs such that the cells of each said row of cells communicate with the filtrate chamber.

6. An apparatus according to claim 5, wherein said further wall means are arranged such that the cells of each row of cells are at least partly above said pool of fine fraction at some point of revolution of the discs at the ascending part of the discs, while the outlet of the accumulation chamber associated to the row of cells opens into said pool of fine fraction.

7. An apparatus according to claim 6, wherein said further wall means are arranged, such that the cells of each row of cells are at least partly above the suspension in the container at some point of revolution of the discs at the ascending part of the discs, while the outlet of the accumulation chamber associated to the row of cells opens into said pool of fine fraction.

8. An apparatus according to any one of claims 5 to 7, wherein the outlet of each accumulation chamber is circumferentially displaced backwardly in the direction of rotation of the discs in relationship to the row of cells associated to the accumulation chamber.

* * * * *